(12) United States Patent
Horner et al.

(10) Patent No.: US 6,484,904 B1
(45) Date of Patent: Nov. 26, 2002

(54) TWO-COMPONENT CARTRIDGE SYSTEM

(75) Inventors: Terry A. Horner, Allentown, NJ (US); Daniel William Mottram, Cream Ridge, NJ (US)

(73) Assignee: Tah Industries, Inc., Robbinsville, NJ (US)

( * ) Notice: Subject to any disclaimer, the term of this patent is extended or adjusted under 35 U.S.C. 154(b) by 0 days.

(21) Appl. No.: 09/861,971

(22) Filed: May 21, 2001

(51) Int. Cl.⁷ .................................................. B67D 5/52
(52) U.S. Cl. ................... 222/137; 222/145.1; 222/541.5
(58) Field of Search ........................... 222/541.5, 145.1, 222/137; 215/235, 237

(56) References Cited

U.S. PATENT DOCUMENTS

| | | | |
|---|---|---|---|
| 3,506,157 A | * | 4/1970 | Dukess ..................... 222/541.5 |
| 4,767,026 A | | 8/1988 | Keller et al. |
| 4,819,836 A | | 4/1989 | Meckenstock |
| 4,846,373 A | | 7/1989 | Penn et al. |
| 5,022,563 A | | 6/1991 | Marchitto et al. |
| 5,052,243 A | | 10/1991 | Tepic |
| 5,137,182 A | | 8/1992 | Keller |
| 5,165,572 A | | 11/1992 | Bath |
| 5,423,443 A | * | 6/1995 | Keller ...................... 222/541.5 |
| 5,535,922 A | * | 7/1996 | Maziarz ................... 222/541.5 |

FOREIGN PATENT DOCUMENTS

| | | |
|---|---|---|
| DE | 2017292 | 10/1971 |
| DE | 2302364 | 9/1974 |
| EP | 0121342 | 10/1989 |
| EP | 0431347 | 4/1995 |

* cited by examiner

Primary Examiner—Philippe Derakshani
(74) Attorney, Agent, or Firm—Selitto, Behr & Kim

(57) ABSTRACT

A cartridge system for multi-component reactive viscous fluids which includes a plurality of syringe elements conjoined and discharging into an outlet having a matching plurality of outlet passageways therein. The cartridge has a frangible cap that seals the outlet passageways prior to use, is broken away from the outlet for dispensing and has plugs insertable into the passageways to reseal the cartridge after use. The plugs preferably have lead-in chamfers and a sealing ledge. Orientation device is provided to prevent cross-contamination upon resealing. A cooperating dispenser gun incorporates registration and a retention device to secure the cartridge in position and has an integral cap removal and retention tool.

21 Claims, 6 Drawing Sheets

US 6,484,904 B1

TWO-COMPONENT CARTRIDGE SYSTEM

FIELD OF THE INVENTION

The present invention relates to two-component cartridge systems for viscous fluids, and more particularly to a resealable two-component cartridge for storing and dispensing reactive materials that are stored separately and mixed upon expulsion from the cartridge.

BACKGROUND OF THE INVENTION

Dual dispenser cartridges for two-component reactive material systems, such as epoxy glue, molding compounds, foams and sealants are known and typically have a pair of parallel conjoined syringes, i.e., having a pair of barrels for independently storing two different components and a corresponding pair of conjoined plungers that are slidable in the barrels in piston fashion. When the plungers are simultaneously pushed into the pair of parallel conjoined barrels, the two different materials of the two-component system are simultaneously and proportionally ejected at the outlet end of the syringe pair. In simple, non-commercial systems, the ejecta is most likely to be deposited upon a surface whereon it can be mixed, e.g., by a paddle. Commercial systems typically utilize a nozzle which is threaded onto the outlet and which may include a static mixer. In either case, it remains an objective to improve the simplicity and economy of design of the cartridge, to provide an effective cap that can be removed and replaced to store unused materials and to maintain the separation of chemically reactive components until they are dispensed for their intended purpose, i.e., to prevent cross-contamination. Cross-contamination is known to result in the unintentional chemical reaction between the reactive components resulting in plugging of the cartridge and spoilage of the contents.

SUMMARY OF THE INVENTION

The problems and disadvantages associated with the conventional techniques and devices utilized to store and dispense two-component reactive material systems are overcome by the present invention which includes a cartridge system for simultaneously dispensing two component materials with a cartridge having a pair of reservoirs, each for holding one of the two component materials. The cartridge has an outlet with two passageways therein, a first of the two passageways communicates at one end with the first reservoir and the second of the two passageways communicates at one end with the second reservoir. The cartridge system includes a cap having a pair of plugs extending from a surface thereof. The pair of plugs are attached to the outlet with a first of the plugs sealing the first passageway and a second of the plugs sealing the second passageway. The first and second plugs are detachable from the outlet to permit dispensing the component materials and are reinsertable into the first and second passageways, respectively, to reseal the cartridge after the materials have been dispensed.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
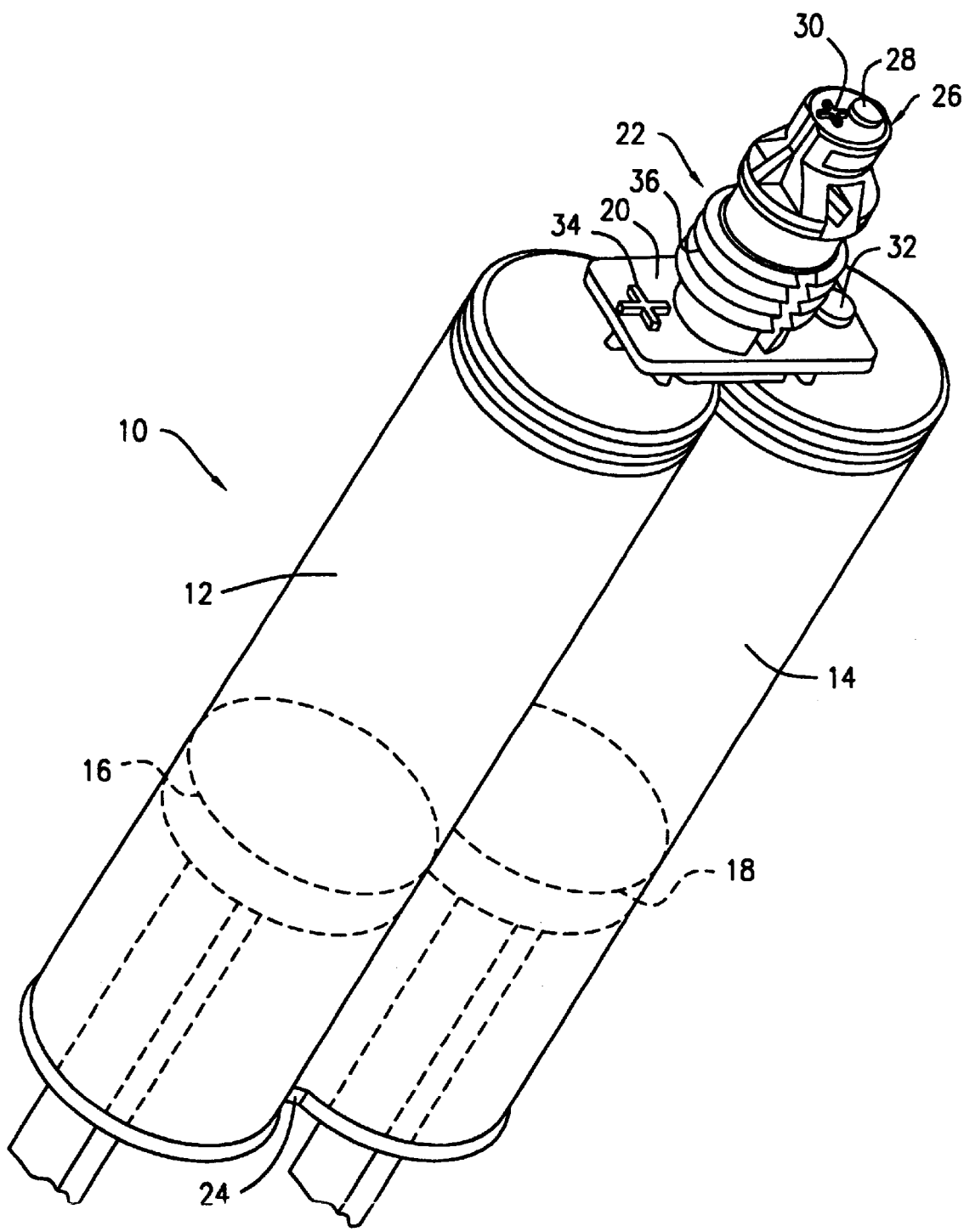
FIG. 1 is a perspective view of a dual-cylinder cartridge in accordance with an exemplary embodiment of the present invention.
Figure 2:
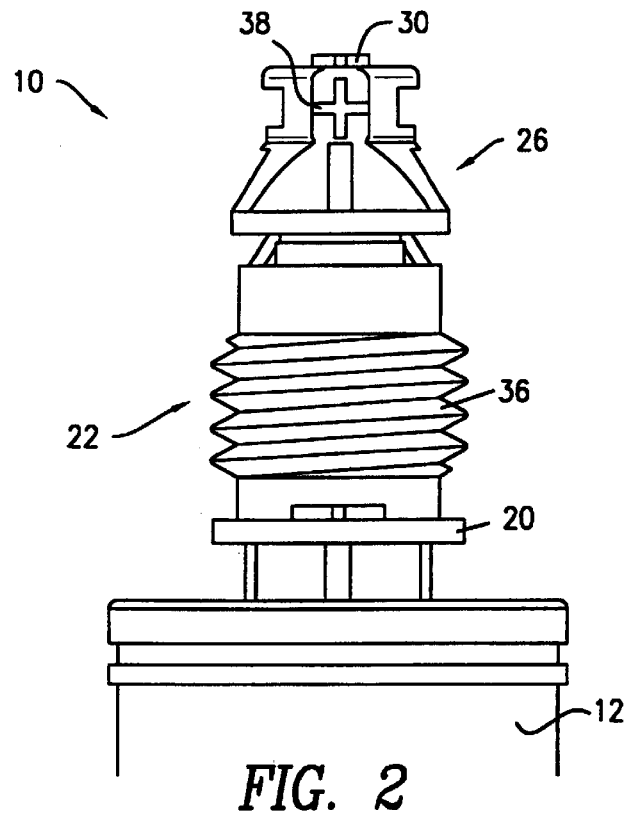
FIG. 2 is an enlarged side view of the outlet end of the cartridge of FIG. 1.
Figure 9:
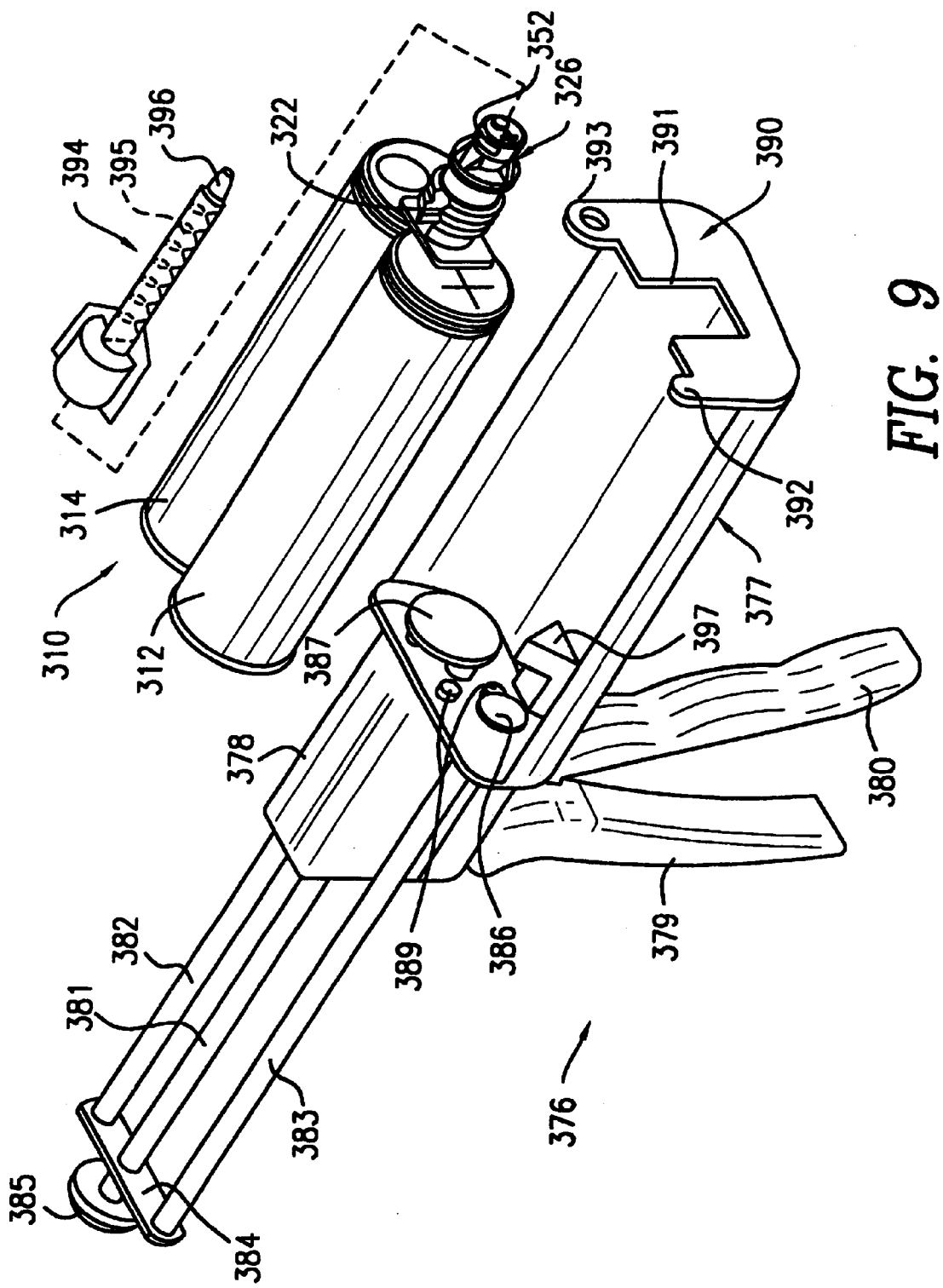
FIG. 9 is an exploded perspective view of a cartridge/ejector gun assembly in accordance with a third exemplary embodiment of the present invention.

FIGS. 1 and 2 show a dual cylinder cartridge 10 having a pair of cylinders 12, 14 for storing two different components, such as the two reactive compounds used in epoxy glue or molding compound. A pair of plungers 16, 18 slide within the cylinders 12, 14 for ejecting the contents through a static mixer (See FIG. 9). Alternatively, the contents may be ejected directly onto a substrate in certain simple, non-commercial applications. The plungers 16, 18 are mechanically conjoined and/or are simultaneously, activated, e.g., as shown in FIG. 9 and described below. In simple domestic glue dispensers, the plungers 16, 18 may be conjoined by a common push pad. While two, cylindrical cylinders 12, 14 are shown in FIG. 1, a greater number of cylinders could be employed and they could have a non-circular cross-sectional shape, e.g., octagonal or hexagonal, all within the intended scope of the present invention. The cylinders 12, 14 are mechanically joined at the top by a bridge plate 20 from which extends a common outlet 22. A lower bridging tab 2 mechanically connects the cylinders 12, 14 at the end distal to the outlet 22. The outlet 22 has a cap 26 which maintains an air tight seal to preserve the contents of both cylinders 12, 14 until the cap 26 is removed to expel the contents. The cap 26 has indicia 28, 30 indicating orientation relative to the contents of the cylinders 12, 14, which are also signified by matching indicia 32, 34 on the bridge plate 20. In this manner, the cap portions (to be shown and described below) that contact the components stored in cylinders 12, 14, respectively, will not cross-contaminate any remaining compound to be stored after ejecting when the cap 26 is replaced, i.e., by reversing its original orientation. The outlet 22 has threads 36 to facilitate threading a specialized nozzle (see FIG. 9) thereon, e.g., one having an elongated conical shape to permit applying the compound(s) dispensed into a hard-to-reach area. As noted above, a nozzle containing a static mixer can also be employed. FIG. 2 shows that the cap 26 may be provided with indicia 38 on the side thereof matching that provided on the top at 30. The same type of indicia 38 may be provided on the opposite side of the cap 26 (but bearing a similarity to indicia 28).

Figure 3:
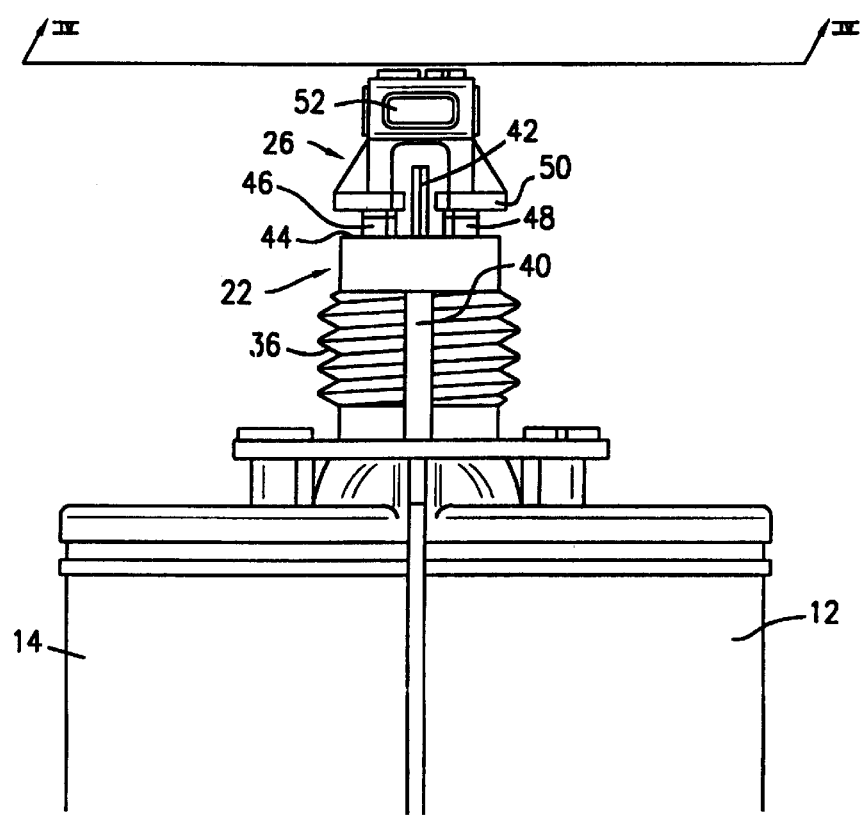
FIG. 3 is an enlarged front view of the outlet end of the cartridge of FIG. 1.

FIG. 3 shows that the outlet 22 is divided into two separate conduits or passageways 54, 56 by a divider wall 55 (see FIG. 4) to permit the compounds separately stored in cylinders 12, 14 to be dispensed through the outlet 22 without mixing. The divider wall 55 may be provided with an internal hollow 40 (see FIG. 3) to decrease plastics usage and to decrease material stress and distortion associated with the injection molding process. The separation of the reactive components is also maintained by divider wall extension 42 that extends from the dispenser end 44 of the outlet 22. Accordingly, even after the reactive compounds are ejected out of the outlet 22, they are kept separated. As noted above, commercial applications frequently utilize a nozzle/static mixer 394, 395 (See FIG. 9) that is threadedly received and retained on the outlet 22. The divider wall 42 can be formed to partially insert into the nozzle/static mixer 394, 395 to insure that no mixing of components occurs prior to the entrance of the compounds into the nozzle/static mixer 394, 395. The cap 26 has a pair of separate nozzle plugs 46, 48 that are inserted into separate outlet apertures,.e.g., 168, 170 (see FIG. 7) as will be seen and described below. The cap 26 also has an abutment flange 50 to limit the insertion depth of the plugs 46, 48. A grasping orifice 52 is provided on the cap 26 to permit the insertion of a screwdriver blade or another tool to provide leverage for breaking the cap 26 away from its integral mounting on the outlet 22 to eject the stored compounds.

Figure 4:
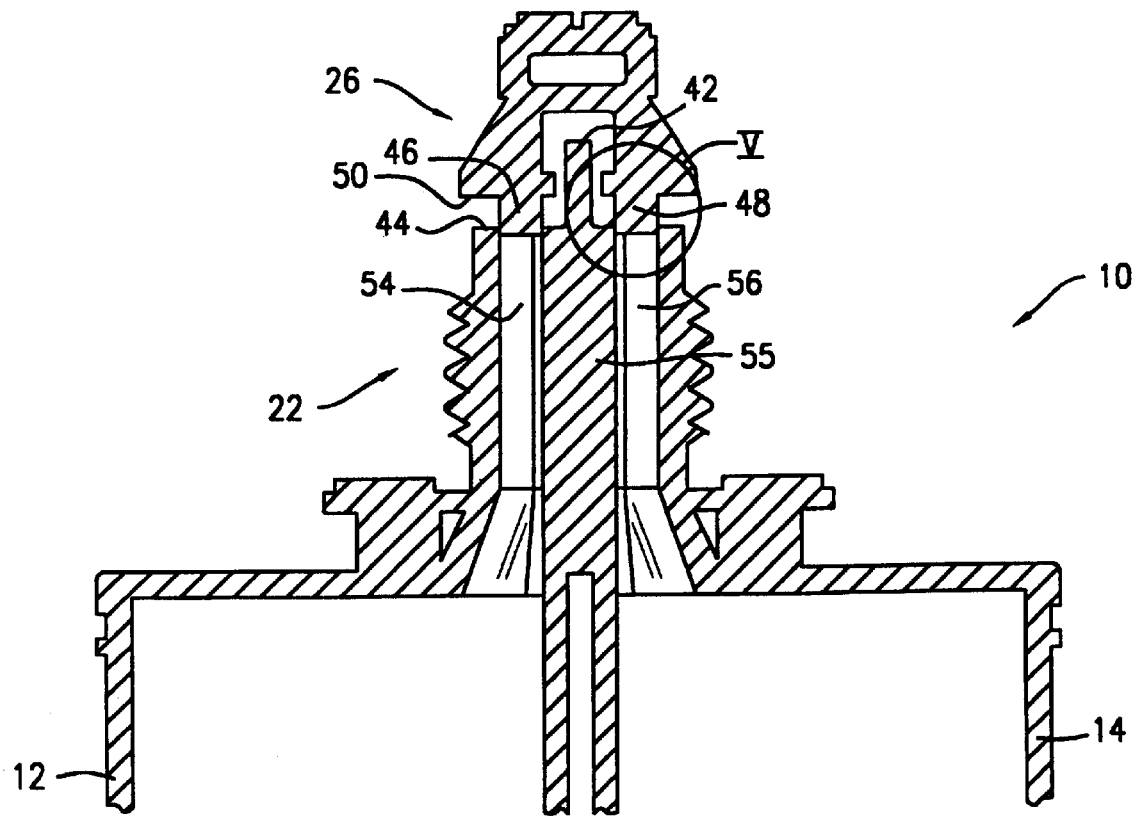
FIG. 4 is a cross-sectional view of the cartridge shown in FIG. 3, taken along section lines IV—IV and looking in the direction of the arrows.
Figure 5:
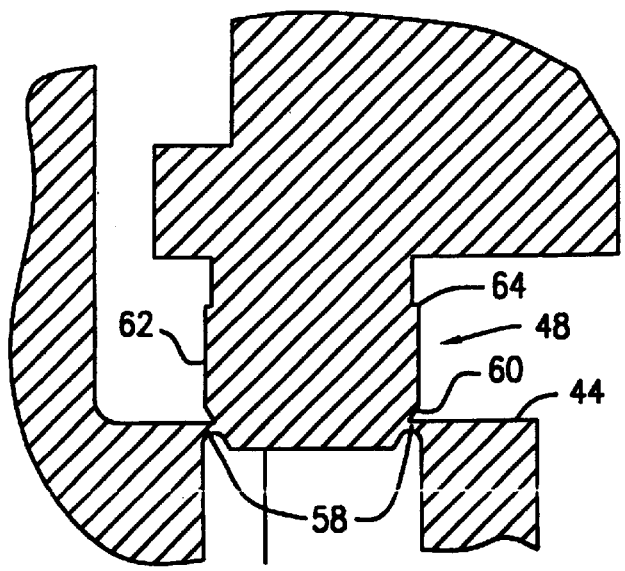
FIG. 5 is an enlarged cross-sectional view of the cartridge shown in FIG. 4, showing the connection of the cap portion of the cartridge to the cartridge outlet.

FIGS. 4 and 5 show that the outlet 22 has two separate passageways 54, 56 communicating with cylinders 12, 14, respectively. The passageways 54, 56 are plugged by plugs 46, 48, which are still connected to the outlet 22, i.e., the cap 26 has not yet been removed. FIG.5 shows that the plugs 46, 48 (48 is shown) are connected to the dispenser end 44 of the outlet 22 by a frangible bridge 58 extending between the outlet dispenser end 44 and the plug 48. To release the compound(s) contained within the cylinders 12, 14, the cap 26 is bent back and/or away from the outlet 22 in order to break the frangible bridge 58 and remove the plugs 46, 48 from their position blocking the passageways 54, 56. The plugs 46, 48 have a taper 60 on their peripheral edge to assist in inserting them back into the passageways 54, 56 to reseal the dispenser 10 in the manner shown in FIG. 6. Each of the plugs 46, 48 have an enlarged portion 62 terminating in a ledge 64. When the plugs 46, 48 are inserted and pressed into the passageways 54, 56 to reseal the cartridge 10, the remnants of the frangible bridge 58 extending from the dispenser end 44, clip over ledge 64, holding the cap 26 in position and increasing the tightness of the seal made by the cap 26 to increase the length of time that the compounds stored in the cartridge can be kept without degradation.

Figure 6:
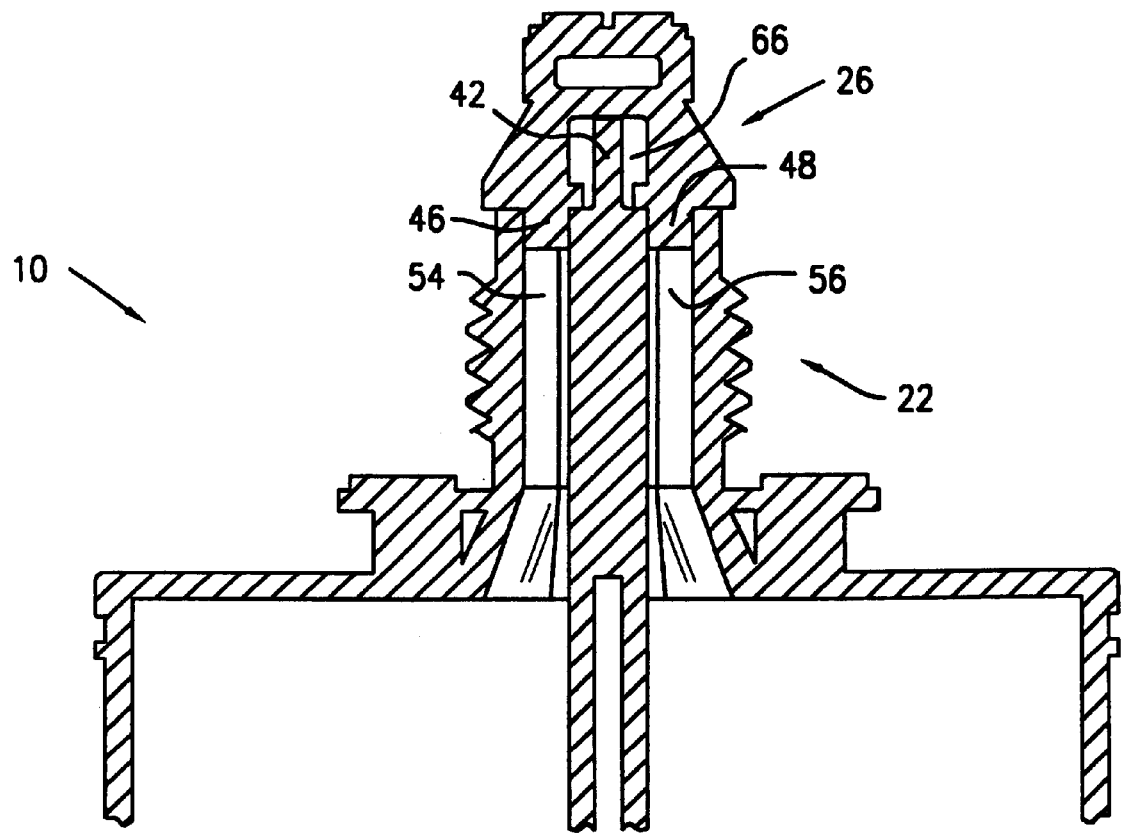
FIG. 6 is an enlarged cross-sectional view like FIG. 5, but showing the position of a replaceable cap after the cap has been removed for expelling a portion of the contents of the cartridge and replaced for storage of the remainder of the contents of the cartridge.

FIG. 6 shows the cap 26 positioned on the outlet 22 with the plugs 46, 48 extending into and sealing the passageways 54, 56. The cartridge 10 may be injection molded from polymers such as polypropylene or polyamide. It should be appreciated that the cap 26 shown in the foregoing figures and described above, works in conjunction with the divider wall extension 42, viz., by bridging thereover. More particularly, a central hollow 66 disposed between the plugs 46, 48 accommodates the divider wall extension 42, both before and after removal and replacement of the cap 26.

Figure 7:
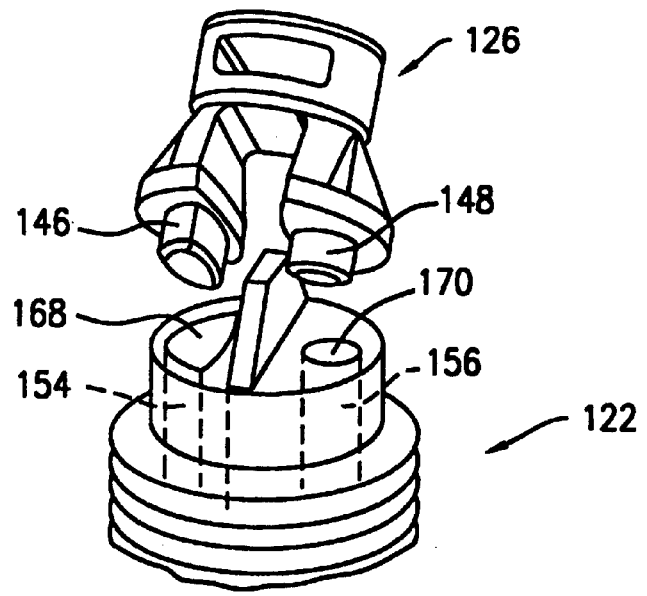
FIG. 7 is an exploded perspective view of the outlet end of a cartridge in accordance with a first alternative embodiment of the present invention.

FIG. 7 shows a first alternative embodiment of the present invention. In describing this alternative embodiment and subsequent alternative embodiments, the same reference numbers as were used above to refer to elements of the above-described embodiment shall be used but incremented by 100, 200, etc. to describe features having the same or similar form and function, unless otherwise noted. In FIG.7, the passageways 154, 156 terminate in outlet apertures 168, 170, respectively having unique shapes relative to one another. The plugs 146, 148 have complementary shapes in order to be received within corresponding outlet apertures, 168, 170. In this manner, the cap 126 can only be replaced on the cartridge outlet 122 in one orientation, thereby preventing cross-contamination between the contents issuing from passageways 154, 156, respectively. The apertures 168, 170 have different cross-sectional areas, which would be particularly suitable for a two-component system wherein the stoichiometric ratio of the first component to the second is not 1:1, e.g., 2:1, 3:1, etc. While the apertures 168, 170 shown have different cross-sectional areas, this is not required. For example, the present invention could be practiced with apertures 168, 170 having a different shape but the same cross-sectional area, e.g., circular and triangularly shaped apertures 168, 170.

Figure 8C:
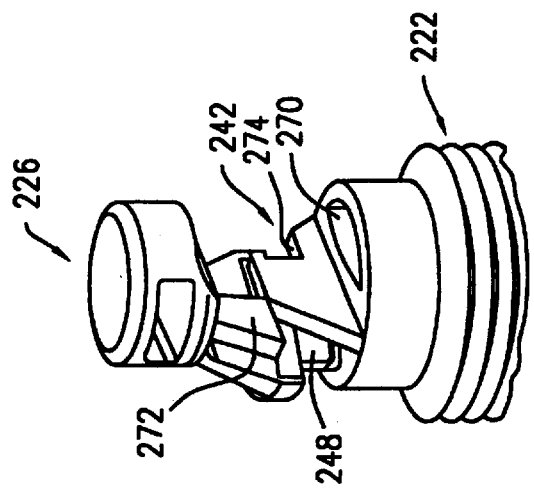
FIGS. 8a–8c are perspective views of the outlet end of a cartridge in accordance with a second alternative embodiment of the present invention with the cap portion in various positions relative to the cartridge.
Figure 8B:
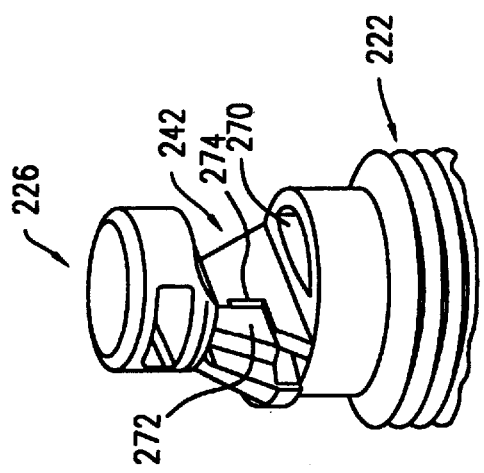
Figure 8A:
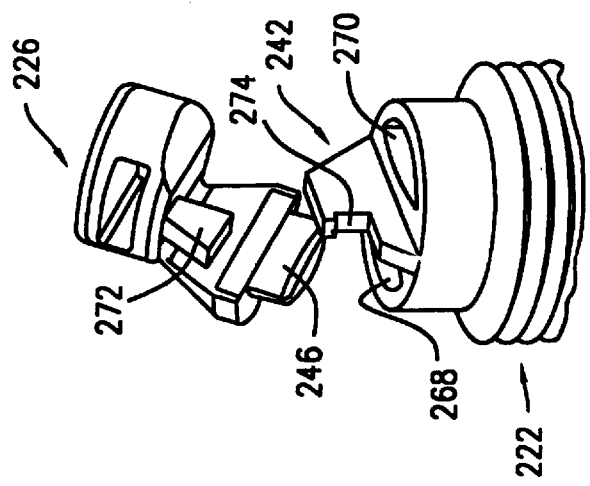

FIG. 8a shows an outlet 222 with orientation features that allow the apertures 268, 270 to be the same shape and still constrain cap 226 replacement orientation, i.e., such that the cap 226 only inserts into the outlet 222 in one selected orientation to prevent cross-contamination. More particularly, the cap 226 has a depending orientation tab 272 that is accommodated in a mating notch 274 in the divider wall 242, but only in the permissible resealing orientation. (Note that one of the plugs, viz., 248 in FIGS. 8a and 8b and 246 in FIG. 8c, has been cut away to permit visualization of the interaction between the tab 272 and the notch 274.) As shown in FIG. 8b, the notch 274 accommodates the tab 272 permitting the plug 246 to enter and reseal outlet aperture 268. The alternative orientation of the cap 226 relative to the outlet 222 is shown in FIG. 8c wherein the interference between the divider wall 242 (opposite to the notch 274) and the tab 272 prevents plug 248 from entering outlet aperture 268. Because correct orientation is assured by the tab 272 and divider wall 242 with notch 274, the apertures 268, 270 may either be the same shape and dimensions or of different shapes and dimensions, as desired.

FIG. 9 shows an dispenser gun 376 for ejecting the compounds contained in a two-component cartridge 310 and which has a cartridge tray 377 affixed to an actuator 378. The actuator 378 is of conventional design, such as might be encountered in a common caulking gun having a friction or ratchet advance mechanism. The degree of advancement of the actuator mechanism is controlled by squeezing handles 379, 380, one or both of which moves relative to the other in a conventional manner. In addition to purely mechanical advance mechanisms, the present invention would work equally well with a hydraulic, compressed air or electromagnetic advance mechanism, e.g., as might be encountered on a production line. The ejector gun 376 has at least one actuator rod 381 and a piston rod 382, 383 for each cylinder 312, 314, respectively. Alternatively, the actuator rod 381 can serve as a piston rod, e,g,. replacing 382.

The actuator rod 381 and piston rods 382, 383 are conjoined at one end by a bridge bar 384 to which a pull knob 385 is attached., such that all rods 381, 382, 383 move simultaneously as an assembly. A piston plate 386 is attached to piston rod 383 at the end thereof proximate to the cartridge tray 377. A second, larger piston plate 387 is affixed to the end of piston rod 382 and actuator rod 381. In this manner, the ejector gun 376 can be utilized for cartridges having cylinders 312, 314 of the same or different diameters. As depicted in FIG. 9, the cylinders 312, 314 are the same diameter but they could be of different diameters for the purpose of dispensing reactive compounds in other than a 1:1 ratio. In that instance, the larger of the cylinders 312, 314 can be positioned proximate the larger piston plate 387, with the smaller of the cylinders 312, 314 positioned proximate piston plate 386. The present invention does not require that the pistons 386, 387 have different dimensions, i.e., they may have the same dimensions.

The tray 377 is held to the actuator portion 378 by a plurality of fasteners 389, by welding, gluing or other conventional means. Distal to the actuator 378, the tray has an end plate 390 with a cartridge docking cutout 391 for slideably receiving and embracing the cartridge 310 at the base of the outlet 322. A cap removal tab 392 extends from an upper corner of the end plate 390 and has dimensions approximating the internal dimensions of the grasping orifice 352 provided in the cap 326, (See FIG. 3, reference number 52 for an enlarged view of a grasping orifice.) Given this relationship, the cap removal tab 392 can be inserted into the grasping orifice 352 to exert a twisting force to snap the cap 326 off the outlet 322 to open the cartridge 310. The removal tab 392 may be dimensioned relative to the grasping orifice 352 to have a friction fit therein such that cap 326 can be left on the removal tab 392 while the cartridge 310 is in use. In this manner, the cap 326 is not lost or subjected to contamination while the cartridge 310 is in use and may be readily retrieved for resealing the cartridge when ejecting is completed.

A nozzle tip orifice 393 may be incorporated in the end plate 390 for aiding in the removal of portions of the nozzle tip. More particularly, a nozzle 394, which may incorporate a static mixing element 395 (in dashed lines) is provided with a snap-off tip 396. The tip 396 may be snapped off to control the outlet aperture size of the nozzle 394, That is, the tip 396 has a predetermined outlet aperture size. When the tip 396 is snapped off, a larger diameter outlet aperture results. The nozzle tip orifice 393 accommodates the tip 396 therein and provides leverage over the tip 396 to aid in snapping it off. A cartridge support 397 extends up from the bottom of the tray 377 and inserts between the cylinders 312, 314 to prevent lateral motion of the cartridge 310 to retain the cartridge in alignment with the motion of the piston plates 386, 387 to maximize the transfer of force from piston plates 386, 387 to expel the compound from the cartridge 310.

It should be understood that the embodiments described herein are merely exemplary and that a person skilled in the art may make many variations and modifications without departing from the spirit and scope of the invention as defined in the appended claims. Accordingly, all such variations and modifications are intended to be included within the scope of the invention.

We claim:

1. A cartridge system for simultaneously dispensing two component materials, comprising:
   (a) a cartridge having a pair of reservoirs, each for holding one of the two component materials;
   (b) an outlet disposed at an end of said cartridge, said outlet having two passageways therein, a first of said two passageways communicating with said first reservoir and a second of said two passageways communicating with said second reservoir; and
   (c) a cap having a pair of plugs extending from a surface thereof, said pair of plugs attached to said outlet with a first of said pair of plugs sealing said first passageway and a second of said pair of plugs sealing said second passageway, said first and second plugs being detachable from said outlet to permit dispensing the component materials, said first and second plugs being insertable into said first and second passageways, respectively, to reseal said cartridge after the materials have been dispensed, said pair of plugs being monolithically formed with said outlet and attached thereto by a frangible portion, said frangible portion breaking when said cap is detached from said outlet.

2. The cartridge system of claim 1, further including a divider wall extending from said outlet between said first passageway and said second passageway, said divider wall isolating the two component materials during dispensing.

3. The cartridge system of claim 2, wherein said pair of plugs bridges said divider wall.

4. The cartridge system of claim 3, wherein said outlet is threaded to receive a nozzle with a lumen and a female threaded portion at one end, said lumen having a threshold proximate said female threaded portion with a shape complementary to said divider wall, said divider wall matingly inserting into and partitioning said threshold.

5. The cartridge system of claim 4, wherein said nozzle has a static mixer positioned within said lumen.

6. The cartridge system of claim 1, wherein said first plug has different dimensions than said second plug and each are matingly received within said first and second passageways, respectively, thereby preventing said first plug from being inadvertently inserted in said second passageway and said second plug from being inadvertently inserted in said first passageway.

7. The cartridge system of claim 6, wherein said first plug and said second plug differ in size.

8. The cartridge system of claim 6, wherein said first plug and said second plug differ in shape.

9. The cartridge system of claim 1, further comprising cap orientation means, including a first orientation element incorporated on said cap and a second orientation element incorporated on said outlet, said first and second orientation elements permitting said cap to be installed on said outlet in only one selected relative orientation.

10. The cartridge system of claim 2, wherein said cap has a tab extending from said cap parallel to said pair of plugs and said divider wall has a notch for receiving said tab, said tab fitting within said notch only when said first plug is inserted in said first passageway and said second plug is inserted in said second passageway.

11. The cartridge system of claim 1, further including indicia provided on said cap and on said outlet for graphically indicating the relative orientation of said cap and said outlet that corresponds to said first plug inserting in said first passageway and said second plug inserting into said second passageway.

12. The cartridge system of claim 1, wherein said first plug and said second plug each have a chamfered peripheral edge on an end thereof distal to said cap to aid in introducing each into said first passageway and said second passageway, respectively.

13. The cartridge system of claim 12, wherein said plugs have a peripheral ledge disposed intermediate said chamfered peripheral edge and said cap, said frangible portion at least partially clipping over said ledge when said first plug and said second plug are inserted in said first passageway and said second passageway, respectively, to thereby promote the formation of a seal therebetween.

14. The cartridge system of claim 1, wherein said cap has a flange disposed at right angles to said first and second plugs, said flange abutting said outlet when said first and second plugs are inserted into said first and second passageways, respectively.

15. The cartridge system of claim 1, wherein said cap has an opening therein for receiving a tool adapted to provide leverage to remove said cap from said outlet for dispensing the contents thereof.

16. The cartridge system of claim 1, wherein said reservoirs are in the form of a pair of parallel cylinders and further comprising a dispenser gun with a cartridge tray for removably receiving and holding said cartridge, said dispenser gun having a pair of piston elements selectively moveable by actuator means for urging the two component materials from said reservoirs through said outlet.

17. The cartridge system of claim 16, wherein said tray has an end plate distal to said actuator means, said end plate having a slot for slidably receiving said outlet of said cartridge.

18. The cartridge system of claim 17, further including a wedge-shaped cartridge support element attached to a bottom surface of said tray and extending upwards between said pair of cylinders for holding said cartridge in said tray.

19. A cartridge system for simultaneously dispensing two component materials, comprising:

(a) a cartridge having a pair of reservoirs, each for holding one of the two component materials;

(b) an outlet disposed at an end of said cartridge, said outlet having two passageways therein, a first of said two passageways communicating with said first reservoir and a second of said two passageways communicating with said second reservoir; said reservoirs being in the form of a pair of parallel cylinders;

(c) a cap having a pair of plugs extending from a surface thereof, said pair of plugs attached to said outlet with a first of said pair of plugs sealing said first passageway and a second of said pair of plugs sealing said second passageway, said first and second plugs being detachable from said outlet to permit dispensing the component materials, said first and second plugs being insertable into said first and second passageways, respectively, to reseal said cartridge after the materials have been dispensed; and (d) a dispenser gun with a cartridge tray for removably receiving and holding said cartridge, said dispenser gun having a pair of piston elements selectively moveable by actuator means for urging the two component materials from said reservoirs through said outlet, said tray having an end plate distal to said actuator means, said end plate having a cap removal tab formed therein, said cap removal tab insertable into an opening provided in said cap.

20. The cartridge system of claim 19, wherein said cap removal tab has a friction fit relative to said opening in said cap to allow said cap to be retained on said cap removal tab.

21. The cartridge system of claim 19, wherein said end plate has a nozzle tip orifice therein, said nozzle tip orifice receiving a tip of a nozzle and providing leverage to snap off said tip of said nozzle, said nozzle being threadedly receivable on said outlet.

* * * * *